(12) United States Patent
Hilton et al.

(10) Patent No.: US 10,599,471 B1
(45) Date of Patent: Mar. 24, 2020

(54) PROJECT SCHEDULING IN A HETEROGENEOUS DISTRIBUTED COMPUTING ENVIRONMENT

(71) Applicant: Cognizant Technology Solutions U.S. Corporation, College Station, TX (US)

(72) Inventors: Kenneth W. Hilton, Half Moon Bay, CA (US); Karl N. Mutch, Kenwood, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 82 days.

(21) Appl. No.: 15/671,891

(22) Filed: Aug. 8, 2017

Related U.S. Application Data

(60) Provisional application No. 62/372,194, filed on Aug. 8, 2016.

(51) Int. Cl.
*G06F 9/48* (2006.01)
*G06F 9/50* (2006.01)
(Continued)

(52) U.S. Cl.
CPC .............. *G06F 9/4881* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/4887; G06F 9/50;
(Continued)

(56) References Cited

U.S. PATENT DOCUMENTS

| 7,124,105 | B2 | 10/2006 | Hilton |
| 7,680,747 | B2 | 3/2010 | Hilton |

(Continued)

OTHER PUBLICATIONS

Zomaya et al, "Genetic Scheduling for Parallel Processor Systems: Comparative Studies and Performance Issues", IEEE, 1997, pp. 795-812.*

(Continued)

*Primary Examiner* — Charles M Swift
(74) *Attorney, Agent, or Firm* — Dawn-Marie Bey; Bey & Cotropia PLLC

(57) ABSTRACT

A genetic algorithm is described to determine a near-optimal schedule for assigning heterogeneous computations to resources in a heterogeneous computational environment. The genetic algorithm evolves a computation-to-compute resource mapping optimized with respect to a set of interdependent, and possibly conflicting objectives including cost of computation, data transfer cost, time to complete computation, profitability, etc. A set of scheduling plans are randomly created and then evaluated and assigned a fitness value based on the ability to meet a set of weighted objectives. Scheduling plans having desirable fitness values are selected as parents to procreate one or more new scheduling plans, each new plan inheriting resource mappings from at least two parents. This evolutionary process is repeated until the fitness values across scheduling plans converge or a time threshold is exceeded. At the end of evolution, a scheduling plan with the best assigned value is chosen for scheduling.

19 Claims, 9 Drawing Sheets

(51) Int. Cl.
*G06N 3/08* (2006.01)
*G06Q 10/06* (2012.01)
*H04L 29/08* (2006.01)

(52) U.S. Cl.
CPC .............. *G06F 9/4843* (2013.01); *G06F 9/50* (2013.01); *G06F 9/5005* (2013.01); *G06F 9/5022* (2013.01); *G06F 9/5027* (2013.01); *G06F 9/5061* (2013.01); *G06F 9/5066* (2013.01); *G06F 9/5083* (2013.01); *G06N 3/086* (2013.01); *G06Q 10/0631* (2013.01); *H04L 67/327* (2013.01)

(58) Field of Classification Search
CPC .... G06F 9/5005; G06F 9/5022; G06F 9/5027; G06F 9/5061; G06F 9/5066; G06F 9/5083

See application file for complete search history.

(56) References Cited

U.S. PATENT DOCUMENTS

| | | | |
|---|---|---|---|
| 7,756,787 B1 | 7/2010 | Hilton | |
| 2003/0028578 A1* | 2/2003 | Jain | G06F 9/5066 718/100 |
| 2006/0218551 A1* | 9/2006 | Berstis | G06F 9/4881 718/102 |
| 2010/0146515 A1* | 6/2010 | Shpigelman | G06F 9/4881 718/104 |
| 2011/0131576 A1* | 6/2011 | Ikegaya | G06F 9/455 718/1 |
| 2012/0096466 A1* | 4/2012 | Sun | G06F 9/4881 718/102 |
| 2013/0054045 A1* | 2/2013 | Ramezani | B60L 53/63 700/297 |
| 2014/0114717 A1* | 4/2014 | Davis | G06Q 10/1097 705/7.21 |
| 2014/0289733 A1* | 9/2014 | Fritz | G06F 9/5066 718/104 |
| 2015/0033220 A1* | 1/2015 | Venkat | G06F 9/45541 718/1 |
| 2017/0220016 A1* | 8/2017 | Zhou | G05B 19/0426 |

OTHER PUBLICATIONS

Zomaya et al, "Observations on Using Genetic Algorithms for Dynamic Load-Balancing", IEEE, 2001, pp. 899-911.*

Page et al., "Dynamic Task Scheduling Using Genetic Algorithms for Heterogeneous Distributed Computing." In Parallel and Distributed Processing Symposium, 2005. Proceedings. 19th IEEE International, 8 pages.

Grattafiori, "Understanding and Hardening Linux Containers," NCC Group, Apr. 20, 2016, 122 pages.

* cited by examiner

PROJECT SCHEDULING IN A HETEROGENEOUS DISTRIBUTED COMPUTING ENVIRONMENT

CROSS-REFERENCE TO OTHER APPLICATIONS

This application claims priority to U.S. Provisional Application No. 62/372,194, filed Aug. 8, 2016, entitled "PROJECT SCHEDULING IN A HETEROGENEOUS DISTRIBUTED COMPUTING ENVIRONMENT, WITH OPTIONAL COMPUTE AUCTIONING", which is incorporated by reference herein.

FIELD OF THE INVENTION

The invention relates to a heterogeneous set of computing resources, and more particularly, the use of genetic algorithms to evolve a plan for scheduling a mixed workload to make optimal use of such computing resources.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In the realm of distributed computing, overall system operation can be greatly impacted one way or the other by the decisions about which computations are carried out on which compute resources. Optimizing the distribution of work is a type of scheduling problem: some logic mechanism decides when to compute what, where, when and for how long. Traditionally such scheduling use deterministic rules arrived at by study and experimentation, but these typically only achieve optimal utilization of compute resources when the compute resources are homogeneous, and often only when the computations are as well. As used herein, in the context of an environment comprising compute resources for assigning computation, "homogeneous" means that each compute resource is identical to the others in use, in terms of configuration, capability, capacity, and availability. How effectively a distributed computing scheduler assigns work to compute resources determines in large part the financial costs associated with those computations. In a homogeneous computing environment one may determine the optimal schedule to execute a distributed program a priori as a straightforward set of calculations.

Scheduling heterogeneous computations on a set of heterogeneous compute resources is an active area of research, where the differences between compute resources include, but are not limited to: availability, computational power (clock frequency, number of cores, cache sizes, etc.), available volatile storage (memory), available persistent storage (disk), bandwidth for inter-process communications and data transfer, various forms of latency, time to load data, etc. In such an environment the costs to execute a distributable program can vary significantly based on which compute resource is selected. This scheduling problem is further complicated when the compute resources and communications with and between them have time varying performance and prices, depending on external factors such as market forces (e.g., supply and demand), and environmental conditions (e.g., network performance and reliability in different parts of the world.)

In such a heterogeneous distributed computing environment, determining the optimal scheduling of work among a set of such compute resources is a combinatorial problem of enormous size and complexity, for which there does not exist a closed form or effective heuristic solution: this problem is generally accepted to be NP-Hard.

SUMMARY

A genetic algorithm is used to address the problem of determining a near-optimal schedule for assigning heterogeneous computations to resources in a heterogeneous computational environment. The genetic algorithm is used to evolve a computation-to-compute resource mapping, which is optimized with respect to a set of inter-dependent, and possibly conflicting objectives including cost of computation, data transfer cost, time to complete computation, profitability, etc. Whereas a compute-farm provider may wish to optimize profit, a user of the platform may wish to minimize cost and/or execution time. A fitness function may be used to evaluate a scheduling plan so that the better the fitness value for a plan, the more optimized the plan is for the one or more desired objectives. The result may be a heterogeneous computational environment which meets the particular priorities of its users to a far greater extent.

A genome represents a scheduling plan comprising a permutation of [project, compute resource] mappings. Scheduling plans may be created randomly at first and assigned a fitness value based on the fitness value assigned by the fitness function. The best scoring scheduling plans are selected to generate additional plans to replace the worst scoring plans, using an algorithm which exponentially favors plans with better scores over plans with worse scores, although all plans however unfit have a chance (however small) of being selected. The cycle of generating new permutations, scoring, and selecting ends when the fitness values converge to within an interval of each other, or when an allocated computation time runs out. Upon convergence, one of the surviving scheduling plans (that is, plans not replaced by a higher scoring plan) is selected for use in provisioning projects to compute resources. When time runs out, the plan with the best fitness value may be used even if the plan has not yet been determined to be optimal.

BRIEF DESCRIPTION OF THE DRAWINGS

The included drawings are for illustrative purposes and serve only to provide examples of structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

DETAILED DESCRIPTION

Figure 1:
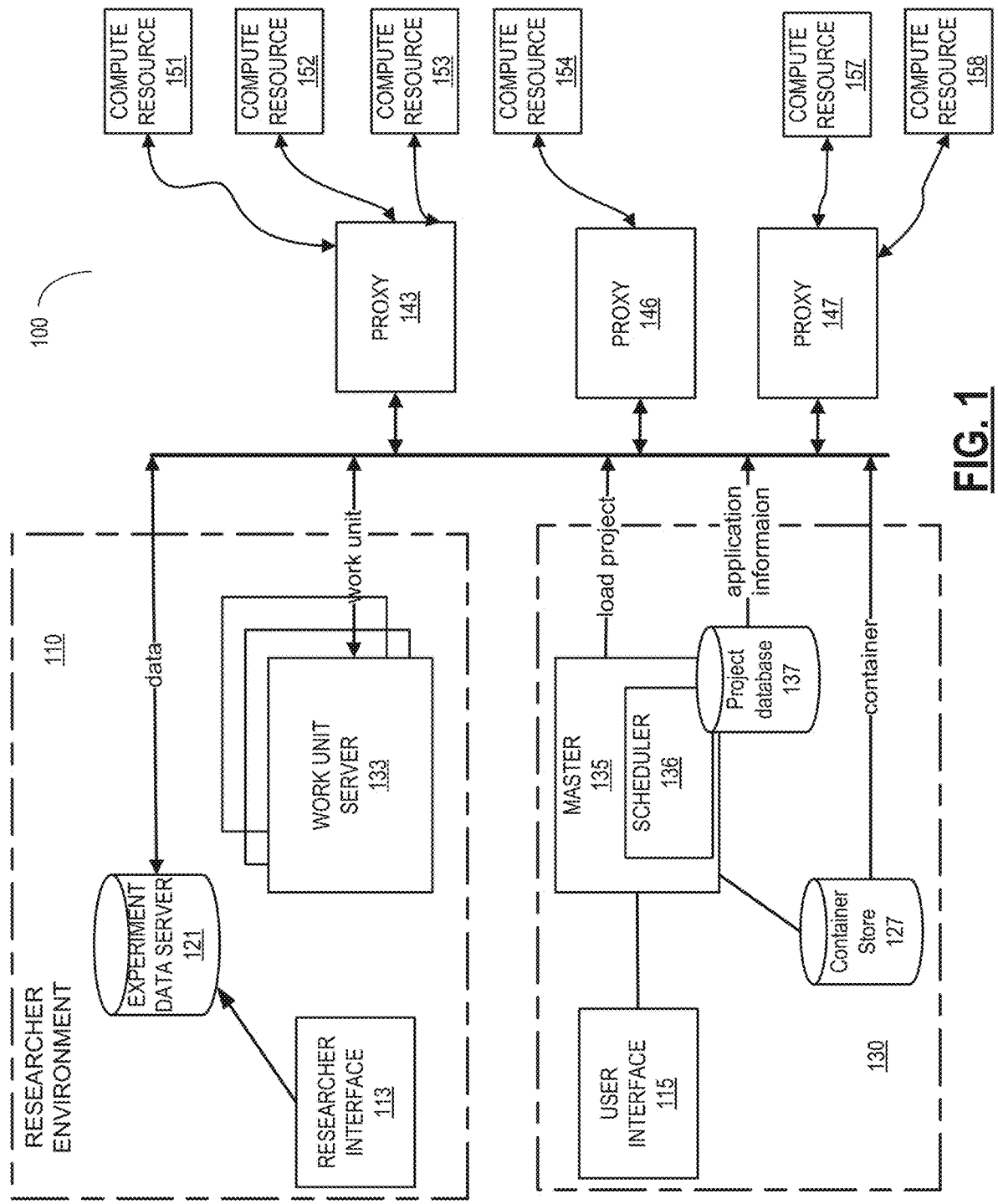
FIG. 1 is a block diagram that illustrates an execution environment for defining work projects and assigning project work units to compute resources, according to an embodiment of the invention.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Terminology as Used Herein

Scheduling Plan: A scheduling plan 800 includes one or more computation assignments 805 that assign a project/work unit to be executed by a particular compute resource.

Computation Assignment: Included in a scheduling plan 800, a computation assignment 805 assigns a project 810 to a compute resource 840.

Compute resource: A compute resource 840 is a computation processing element or a data storage system used to execute a portion of an application to perform an experiment. A compute resource may be a server farm, an individual server having multiple processor cores, an individual PC, a cell phone, or any other kind of processor or storage system. It may for example be a GPU having a specified number of cores, a CPU having a specified number of cores, a field programmable logic array (FPGA), an accelerated processing unit (APU), a digital signal processor (DSP). It can also be any combination of two or more of the above, whether unitary in structure or separated across a communication bus. Each compute resource has associated information regarding hardware architecture, operating system, GPU, amount of disc space, amount of memory, speed of networks, etc.

Project: A project 810 specifies for an experiment an application 820 and a work unit server.

Experiment: An experiment 830 is a scientific experiment that requires compute-intensive work to be performed. To complete such work in a reasonable amount of time depends on allocating a large number of computer resources on which computations may be performed concurrently. An experiment comprises a plurality of computations, each of which may be separately assigned to different computing resources for execution. Independently schedulable computations are also referred to herein as work units.

Work unit: Independently schedulable computations of an experiment. A work unit 832 may comprise one or more files and/or commands 833, and specifies the data needed as input for the computation of the work unit.

Computation: A set of computer instructions. One or more computations are included in a work unit 832. Independently scheduled means that at least that computations belonging to one work unit may be executed concurrently with computations in other work units.

Application: An application 820 is a set of computer implementation objects used to perform an experiment. The application defines the resource requirements 822, such as memory and disc space, that a compute resource must provide to perform the experiment. The application also includes one or more containers 824, each container associated with a particular hardware architecture and operating system type 825 and program executables 826.

Container: A container 824 is included in an application and contains program executables and other configuration files that are targeted to run on a specific hardware architecture running a specific operating system.

There are many examples of projects requiring compute-intensive work to be performed, such as certain scientific experiments, for which completion in a reasonable amount of time depends on allocating a large number of compute resources on which computations may be performed concurrently. An example of such a project is one that renders frames for a movie. There may be one renderer application that is compiled for execution in different runtime environments. The executable programs are installed on all of the compute resources allocated to the task. A work unit is performed by a particular compute resource rendering a frame at a particular time in the movie. A frame for one time in the movie may be rendered independently from, and concurrently with, another frame for a different time in the movie. It is said herein that an "experiment is performed" and an "application is executed" when a researcher's calculations are deployed and run on the assigned compute resources.

To address the problem of scheduling multiple projects in a heterogeneous computational environment, a genetic algorithm is used to evolve a scheduling plan that maps projects to compute resources in a way that optimizes one or more objectives. FIG. 1 is a block diagram that illustrates an execution environment for defining work projects and for assigning work units to compute resources (provisioning), according to an embodiment of the invention. The execution environment 100 includes three distinct administrative domains: the researcher environment, the provisioning control environment, and the compute resources environment. A person (referred to herein as a researcher, though the person need not have any particular title or scientific qualifications) wanting to execute a compute-intensive program develops the program in their development environment separate from what is illustrated in FIG. 1. The researcher defines a container, which is a collection of files to be installed on a compute resource. Each container holds files for a target computer architecture (Intel, AMD, and ARM), GPU (CUDA and OpenCL) and OS type (Linux, Windows, OSX). Alternatively, each container may be a "Docker" container, or one that satisfies the specifications of Kubernetes, K8s or Apache Mesos containers. Docker containers are described in *Understanding and Hardening Linux Containers*, NCC Group Whitepaper, Apr. 20, 2016—Version 1.0, Prepared by Aaron Grattafiori Technical Director and incorporated by reference herein.

The Researcher Environment 110 provides an interface to the researcher for loading data to be used in the experiment into the Experiment Data Server 121. This data will be cached within the compute resources environment at a location near to a compute resource assigned to execute the application. In an embodiment, the proxy for the assigned compute resource may cache the data. An experiment comprises a plurality of computations, each of which may be separately assigned to different computing resources for execution. Independently schedulable sets of computations are also referred to herein as work units. The Work Unit Server 133 receives requests from a compute resource available to perform work for a project and responds by providing a work unit. The work unit server may provide an interface that all proxies (and potentially compute resources) use to request a work unit from the work unit server. In an embodiment of the invention, the work unit server includes code provided by the researcher who implements a standard interface that is invoked when the work unit server receives a request. The project-specific code may return a blob of data whose structure is interpreted by the application executing on the compute resource. For example, a work unit may comprise one or more files and/or commands. In one embodiment, there may be a distinct work server instance dedicated to each project. In another embodiment, a single instance of the work server unit may be shared among projects that use the same input but perform different analysis or calculations on that data. These projects may or may not implement a state machine. For example, a work unit may provide one or more frames of video from a security camera, and different projects may try to recognize different patterns in the frames of video.

Domain 130 is the provisioning control environment. The User Interface 115 allows an administrator to configure and control the execution environment 100. A researcher uses the User Interface 115 to create a project definition. A project has an application and identifies a work unit server such as 133 and a data server such as 121. The application defines the resource requirements, such as memory and disc space, that a compute resource must provide to perform the experiment. The application also includes one or more containers. Each container contains executables and other configuration files that are targeted to run on a specific hardware architecture running a specific operating system. When a project is assigned to be performed on a particular compute resource, the appropriate container is selected for installation on that resource. The project and application definition information is stored in the Project Database 137. The containers are stored in Container Store 127.

The compute execution environment 100 comprising the compute resources may be in a distinct network domain from the provisioning control environment 130 and may have separate administration. Proxies may be used to relay communication between the compute resources in the execution environment 100 and the components of the provisioning and researcher environments 110. Although FIG. 1 illustrates a proxied environment, the technique can also be performed in an environment without proxies, in which the functions of the proxies are built into each compute resource. In the example illustrated in FIG. 1, there are three proxies 143, 146, and 147. Proxy 143 provides a communication front end for (and is responsible for) compute resources 151, 152, and 153. Proxy 146 front ends compute resource 154, and Proxy 147 front ends compute resources 157 and 158. A proxy is responsible for loading a container onto a compute resource that has been assigned to execute the experiment, provide a data repository for the data used by the computation, request work units for the compute resource, and send back a computation result to the work unit server.

Compute resources 151-158 are the processing elements for executing an application. A compute resource may be a server farm, an individual server having multiple processor cores, an individual PC, a cell phone, or any other kind of processing unit. Proxies may be used to provide a gateway between the researcher environment domain 110 and the compute resources environment domain 100 as well as between the provisioning control domain 130. In that way, the portions of the environment providing the construction, scheduling, and deployment of experiments need not directly interact with any individual compute resource. Each compute resource has associated information regarding hardware architecture, operating system, GPU, amount of disc space, amount of memory, speed of networks, etc.

Once the researcher has defined a project and is ready to start the experiment, a scheduling plan is created that assigns compute resources to perform the experiment. A compute resource is selected for the project, and a container within the project's application that matches or is compatible with the information associated with the compute resource is selected for installing on the selected resource, if not already installed. For example, if a compute resource provides a Linux environment on a AMD core, the resource may only be used if there is an application container targeted to run on Linux on AMD. Even if the application can run on the hardware architecture/OS, the compute resource must provide enough space for performing the experiment as indicated in the application. Master 135 controls the determination of a best scheduling plan. The master 135 initiates Scheduler 136 to find a best scheduling plan for deploying projects to compute resources according to a current set of characteristics such as capacity, speed, and cost of accessing data, and cost of using individual compute resources in the environment. This information may change over time, and the scheduling plan is derived for the current stored set of environment characteristics.

The selected scheduling plan provides master 135 with the list of compute resources assigned to each project. In an embodiment, the master sends project information to each proxy responsible for a compute resource that is assigned by the scheduling plan to launch the project. A proxy retrieves application information from the project data 137 for the project, determines which container is appropriate for an assigned compute resource, and retrieves the appropriate container from the container store 127.

The proxy loads the container onto the compute resource. The compute resource installs the files in the container and prepares to run the executables. The project information provides the location of the experiment data server 121 that holds the data on which the application will operate. If the proxy is configured to pre-fetch data, the proxy may retrieve data from the specified experiment data server before the project application begins to execute. The retrieved data is stored at the proxy, which can provide the data upon request to a compute resource or other proxy on demand. Once a project container is installed on a compute resource (e.g. compute resource 151), the compute resource may request the associated work unit server (for example, Work Unit Server 133) to assign a work unit of the project to perform on the compute resource. This request may be delivered through a proxy in a proxied environment. The work unit definition identifies the data used to perform the computation. Some of this data may be included in the work unit definition itself and other data may be identified by reference to the experiment data server, (e.g. by file name). The proxy loads data needed to execute the application (the needed data that has not already been loaded onto the proxy). In an embodiment, the data is fetched before the proxy delivers the work unit to the compute resource so that when the compute resource requests the data, the data is already on the proxy. In another embodiment, the proxy may provide the work unit to the compute resource first, then proactively fetch the data files in parallel with the compute resource performing computations. When an application needs to use data that is not yet on the proxy, the application waits until the data has been retrieved. When a compute resource completes the assigned work unit, results from the work unit may be sent back to the work unit server through the proxy.

Figure 2:
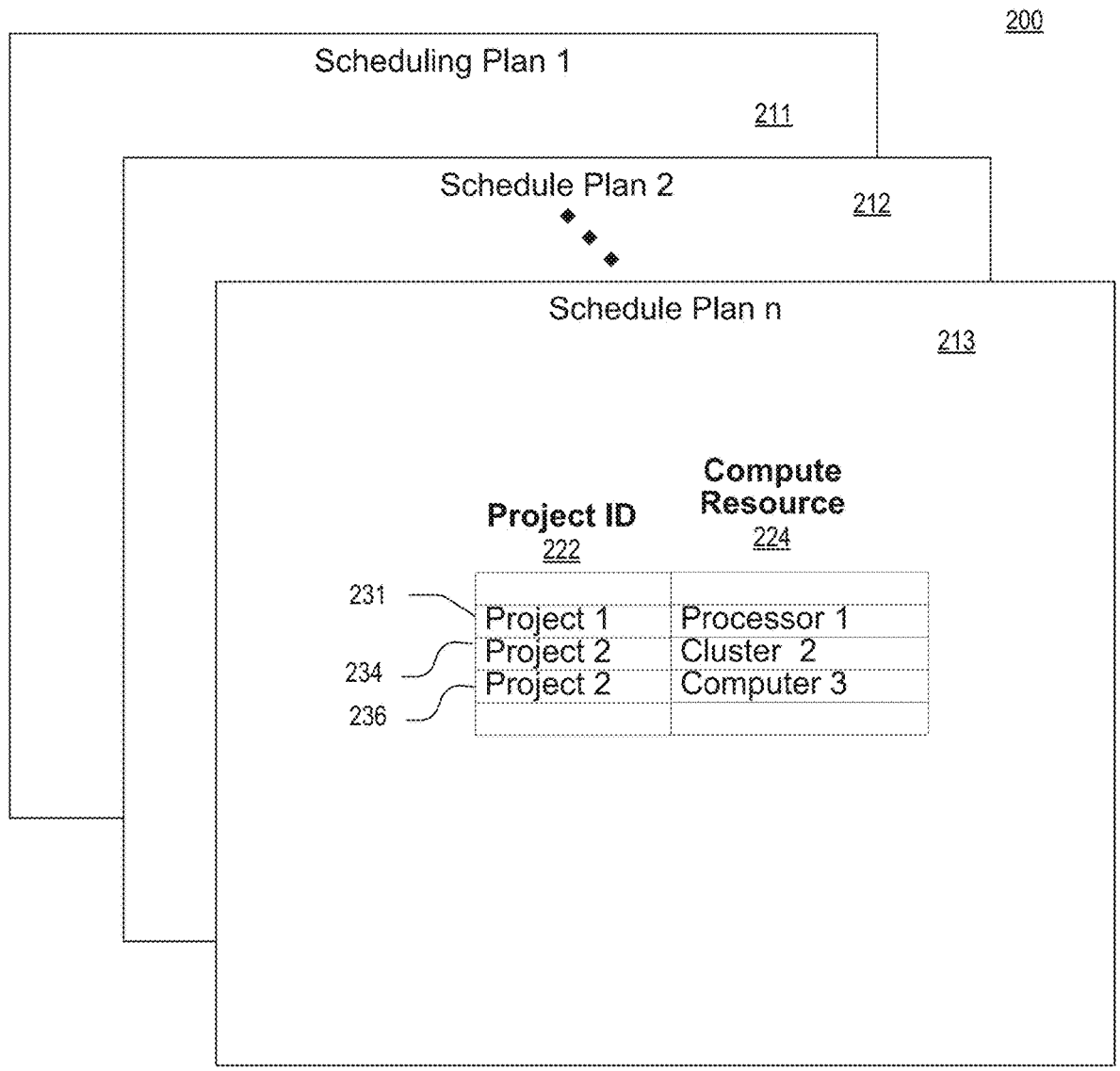
FIG. 2 illustrates multiple scheduling plans for assigning projects to compute and data resources, according to an embodiment of the invention.

FIG. 2 illustrates multiple scheduling plans 200 for assigning projects to compute and data resources, according to an embodiment of the invention. According to an embodiment of the invention, a scheduling plan may be represented as a table with each row representing a computation assignment, each assignment having a project identifier 222 and a compute resource identifier 224. For example, in computation assignment 231 of Scheduling plan n (213), Project 1 is assigned to run on Processor 1. Computation assignments 234 and 236 assign Project 2 to be run on Cluster 2 and Computer 3 respectively. In another embodiment, the scheduling plan may be an array of project identifiers where the index of the array element in which a project identifier is stored indicates to which the compute resource the project is assigned. For example, all compute resources may be numbered consecutively, and a separate array may contain the correspondence between the number of compute resource and its detailed information.

In another embodiment, the list of project identifiers assigned to a compute resource indicated by the position of a project identifier within the list may be stored as a bitstring comprising a concatenation of bits representing each identifier in the list. For example, if the maximum number of projects that the system will handle simultaneously is 256, then 8 bits may be allocated to represent a project identifier assigned to each compute resource with all zeros representing no project assigned. For example, a scheduling plan for 3 compute resources, resource #1 assigned project ID 7, resource #2 not assigned a project, and resource #3 assigned project ID 19, the bitstring representation may be:

00000111 00000000 00010011

Using a bitstring representation for a scheduling plan enables the use of generic genetic algorithm routines for initialization, procreation, and mutation.

Figure 3:
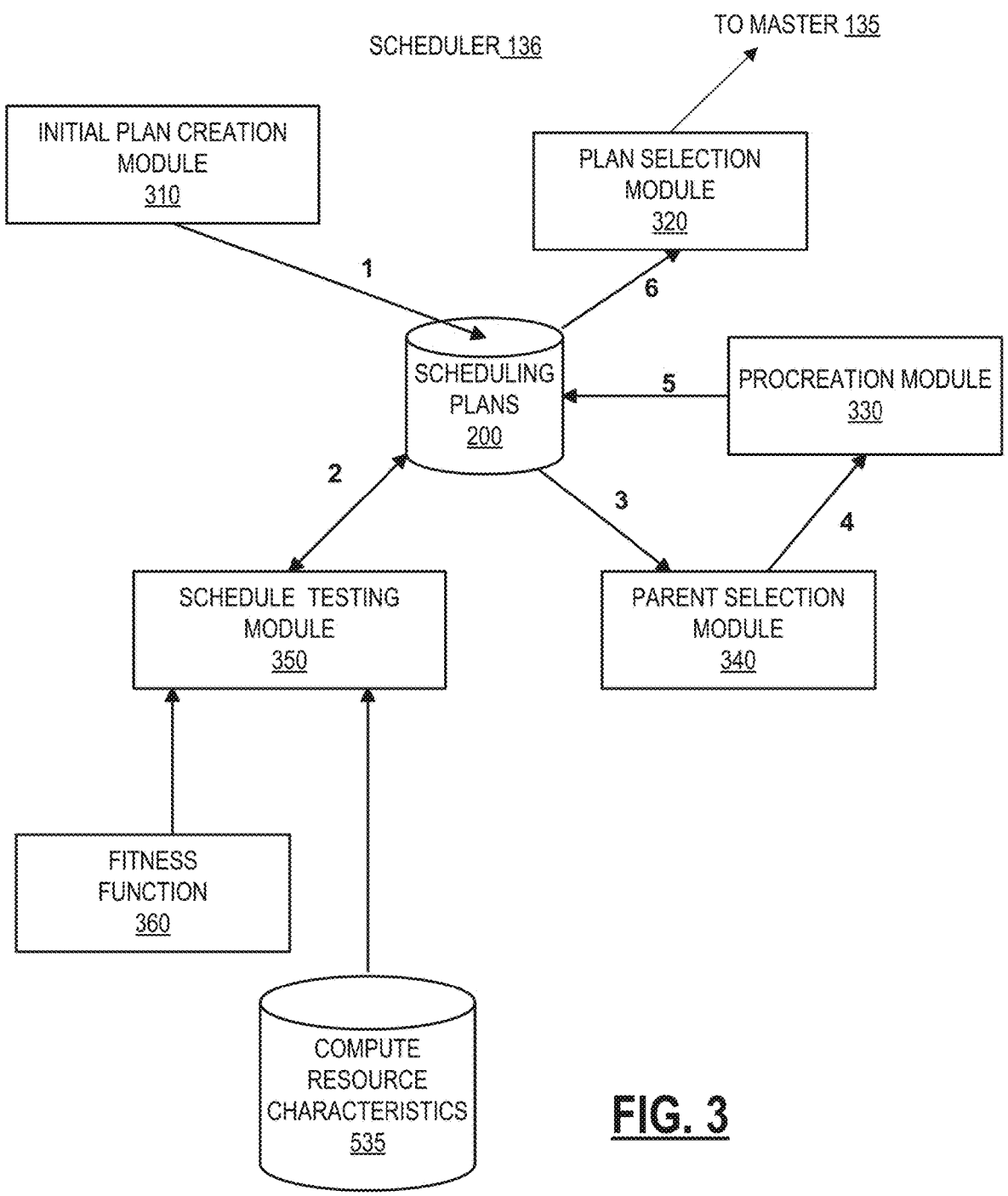
FIG. 3 illustrates components and control flow within the scheduler, according to an embodiment of the invention.

FIG. 3 illustrates components and control flow within the scheduler 136, according to an embodiment of the invention. Scheduler 136 described in FIG. 1 is explained in more detail here. Scheduler 136 comprises several component modules that read and write from a scheduling plans store 200 as described in FIG. 2. The scheduler starts with the Initial Plan Creation Module 310 creating multiple initial scheduling plans. The plans may be generated randomly or may be created so that an assignment of a project to a resource satisfies the constraints of both the project and the resource. For example, a project may require to be run on UNIX system, and a resource may only be available on the weekends. Any plan provisioning for that project may assign that project to a UNIX machine that is available at the time of execution. When multiple resources qualify to execute a project, the choice of which resource to assign may be selected randomly. The newly created plans are stored in the scheduling plans data store 200. Next, the Schedule Testing Module 350 determines a fitness value for each of the plans in the scheduling plans data store 200. The compute environment model 520 includes the schedule testing module 350 and the fitness function 360.

The fitness function 360 is a function of values of desirable characteristics of a plan and the relative weights associated with each characteristic. The fitness value for each plan is stored in association with the plan. Once the fitness of scheduling plans has been evaluated, a determination is made regarding the convergence of results. That is, if the distance among fitness values of the plans is less than a predefined threshold, then the plans have sufficiently converged. Plan Selection Module 320 may select the scheduling plan with the highest assigned fitness value to provide to the Master 135.

If, however, the fitness values have not yet converged across plans, and time is available to continue evolving plans, then new plans are created. In an embodiment, when an entirely new schedule is evolved and its fitness value is not better than the fitness value of the currently executing plan, the new schedule may be discarded. In other words, only when a new schedule has a better fitness value than the currently running plan (and projects are still running according to the previous plan) would the system migrate to the new schedule.

To generate new scheduling plans, the Parent Selection Module 340 selects a subset of the scheduling plans in 200 as parents for procreation. The parents may be selected at random, based on their fitness values, or based on some other characteristic such as diversity (relative novelty). The process of procreation may happen in one of several different ways. For purposes of explanation, the following embodiments are described from simplest to most complex, with the most complex embodiments producing the best plans.

For each pair of parents selected, Procreation Module 330 creates two child plans using a portion of one parent's plan and a portion of the other parent's plan. For example, if there are N compute resources to allocate, some number i between 1 and N may be selected to partition the plans into a first portion A including array entries i . . . 1 and a second portion B including array entries (i+1) . . . N. Each parent plan SP1 and SP2 may be split into two pieces SP1A, SP1B and SP2A, SP2B respectively. A first child may be created by joining SP1A and SP2B and a second child may be created by joining SP2A and SP1B. Table 1 illustrates this process.

TABLE 1

| i = 2; n = 4 | |
|---|---|
| SP1[1] = 7 | SP2[1] = 38 |
| [2] = 6 | [2] = 2 |
| [3] = 38 | [3] = 15 |
| [4] = 2 | [4] = 3 |
| SP1A[1] = 7 | SP2A[1] = 38 |
| [2] = 6 | [2] = 2 |
| SP1B [3] = 38 | SP2B[3] = 15 |
| [4] = 2 | [4] = 3 |
| Child1 | Child2 |
| SP1A[1] = 7 | SP2A[1] = 38 |
| [2] = 6 | [2] = 2 |
| SP2B [3] = 15 | SP1B[3] = 38 |
| [4] = 3 | [4] = 2 |
| Child 1 (7, 6, 15, 3) | Child 2 (38, 2, 38, 2) |

In the example illustrated by Table 1, a first parent assigns project ID 7 to resource 1, project ID 6 to resource 2, project 38 to resource 3 and project ID 2 to resource 4. Similarly, the second parent assigns project ID's (38, 2, 15, and 3) respectively. The split point (also known as the crossover point) is selected as 2, dividing each parent in two parts (1 . . . 2) and (3 . . . 4). Notice that child 2 allocates two cores (compute resources) to each of projects 38 and 2.

When the plans are represented as a bit string, the split point may be a bit position rather than an array entry. The previously explained embodiment is equivalent to restricting the selected bit point to be on an array entry boundary. If each project ID is represented in 8 bits, then the length of each of the plans in Table 1 is 32 bits, and j is restricted to bit 9, 17, or 25 (counting the bits starting at 1). However, a genetic algorithm is not so restrictive. The split point may be at any bit position. If bit position j falls in the middle of the project ID for array index I, then the plan arrays are split into three portions: A (1 . . . i−1), C (i), and B (i+1 . . . N) A and B contribute to the children plans as described with respect to Table 1. However, the project ID at index I will be changed. The same switchover process is performed at the bit level. k=j mod 8. If k=5, then the bits for the ith project ID is split at the fifth bit position. For example, see Table 2.

TABLE 2

J = 21, i = 3; k = 5

| SP1[1] = 7 [1..8] | SP2[1] = 38 |
| [2] = 6 [9..16] | [2] = 2 |
| [3] = 38 [17..24] | [3] = 15 |
| [4] = 2 [25..32] | [4] = 3 |
| SP1[3] = 00100 110 | SP2[3] = 00001 111 |
| Child 1[3] = 00100 111 = 39 | Child 2[3] = 00001 110 = 14 |
| Child1 [1] = 7 | Child2[1] = 38 |
| [2] = 6 | [2] = 2 |
| [3] = 39 | [3] = 14 |
| [4] = 3 | [4] = 2 |

Table 2 illustrates an example in which the split bit j is 21 which falls in the middle of array index i=3 at bit position 5. The children are comprised of three portions (1 . . . 2) (3) (4). Child 1 has project IDs from SP1 at positions 1 and 2, and the project ID from SP2 at position 4. The project ID at position 3 is determined as follows. The project ID value at index 3 in SP1 is 38, which is written as 00100110 in binary. The first 5 bits are 00100 and the last 3 bits are 110. The project ID at SP2[3] is 15 which is written in binary as 00001101, split into two portions 00001 and 101. Child1[3] is formed by taking the first 5 bits of SP1[3] (00100) and the last 3 bits of SP2[3] (111) to create the binary representation of project ID 39.

Although the description of the example in Table 2 helps to conceptualize how a plan may be evolved when selecting a bit position as a crossover point, a more efficient implementation is to represent each plan as a bitstring and switchover the entire bitstring before and after the switch position.

TABLE 3

| SP1 = | SP2 = |
| 00000111/00000110/00100110/00000011 | 00100110/00000010/00001111/00000011 |
| 00000111/00000110/00100 110/00000011 | 00100110/00000010/00001 111/00000011 |
| Child 1: | Child 2: |
| 00000111/00000110/00100 111/00000011 | 00100110/00000010/00001 110/00000011 |
| Child 1: | Child 2: |
| 00000111/00000110/00100111/00000011 | 00100110/00000010/00001110/00000011 |

In an embodiment, two parents are used to create a new plan, and one or more new plans may be created by the procreation module 330 in a single generation. The procreation module stores the new plans in the scheduling plans data store 200. The new plans are evaluated as previously described, and some of the new plans may replace previously created plans based on fitness value so as to maintain the original size of the scheduling plans store 200. Convergence is tested against the new set of scheduling plans as before, and a best plan may be selected and provided to the master 135 when convergence is achieved. Otherwise, a cycle of procreation, testing, and discarding may continue until convergence is reached or evolution time has elapsed. Many variations on this theme may be used for procreation, including multi-point crossover, and allele splitting.

Figure 4:
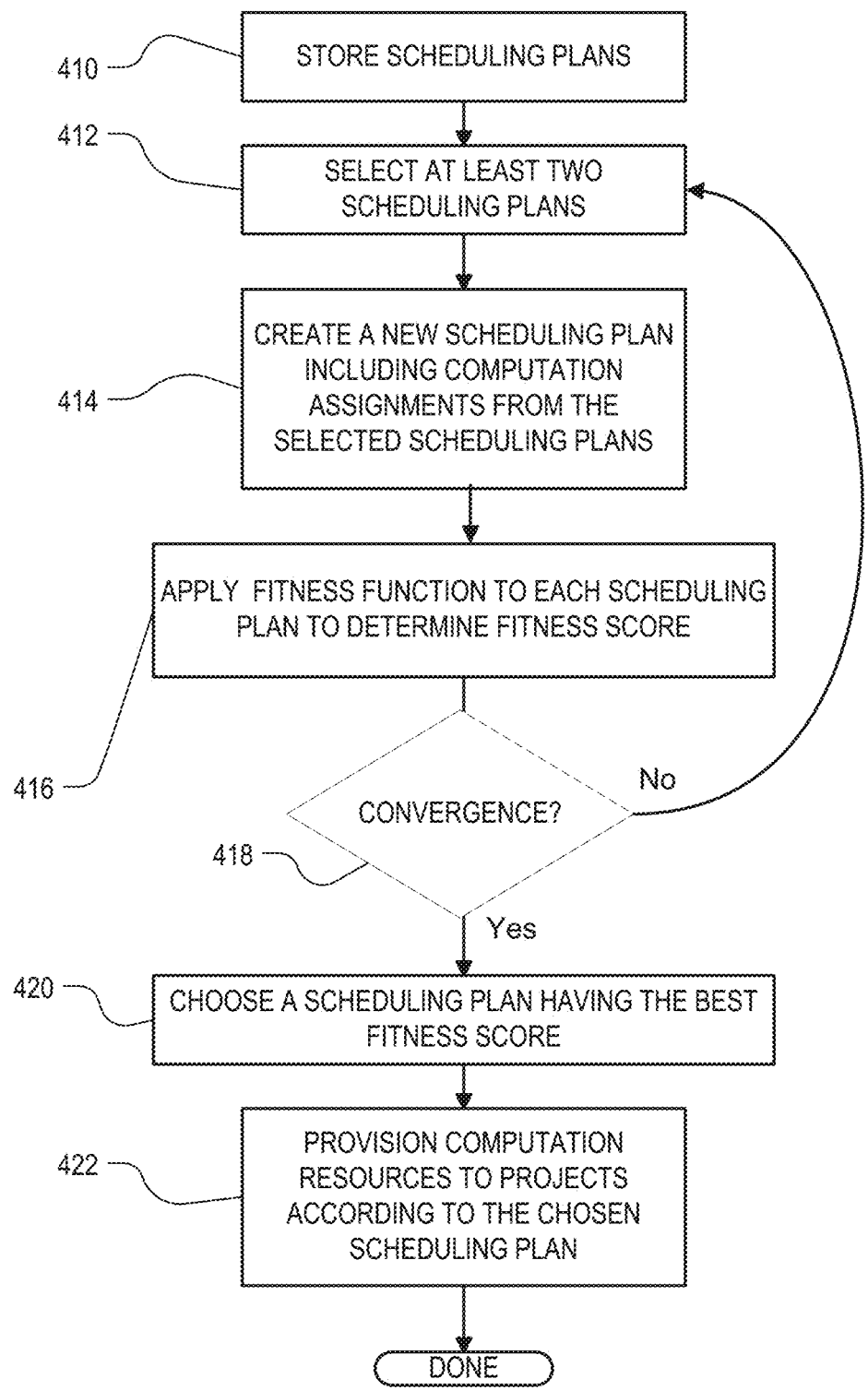
FIG. 4 is a flow diagram illustrating the steps for creating and selecting a scheduling plan for assigning projects to compute resources, according to an embodiment of the invention.

FIG. 4 is a flow diagram illustrating the steps for creating and selecting a scheduling plan for assigning projects to compute resources, according to an embodiment of the invention. In Step 410 an initial set of scheduling plans is stored. In an embodiment, these initial scheduling plans may be tested for convergence before new plans are created. In another embodiment, the initial set of randomly-created plans is not tested. In Step 412, pairs of scheduling plans are selected from the store to procreate a new plan. In an embodiment, genetic material from more than two scheduling plans may be used for creating a new plan in Step 414.

In Step 416, the newly created plans are evaluated to determine a fitness value.

In Step 418, a test is performed to determine whether the scheduling plans have converged; that is, whether the distance between fitness values across the current set of scheduling plans is within a predefined threshold. If convergence has been reached, then in Step 420, one of the plans from the store is selected for directing the provisioning of compute resources to projects. In Step 422, the plan is used for provisioning.

If convergence was not met in Step 418, then control proceeds to step 412 to begin a new generation of procreation and testing.

This process of choosing 2 parents and producing 2 children from them is repeated until the next generation of scheduling plans is fully populated. This can be the same number of plans as in the current population, or the population can be allowed to grow (adding to the existing population) or shrink (replacing the current population) over time. Typically, the population is fixed in size or allowed to grow to a maximum fixed size, which is maintained for the remainder of the genetic algorithm run.

Each new plan that is created is processed for mutation. At a conceptual level, this means that with a very low probability, any of the Project ID's assigned to a computing resource may be randomly changed to another ID. In an embodiment, a random number may be generated to determine whether a plan is to be mutated. In an embodiment, another random number may be generated to determine which project ID to change and the new project ID value to assign to the corresponding compute resource. In an implementation using a bitstring representation for plans, a random number may determine which bit position within the bitstring to toggle (0 to 1 or 1 to 0).

When creating a new scheduling plan, there may be a discrete set of project ID's representing a set of projects that is ready to be scheduled. The project ID's may not be contiguous. Thus, the evolution and mutation process that changes a project ID may result in creating a project ID that has not been assigned to any project in the set of projects waiting to be scheduled. Unlike biological genetic evolution on which genetic algorithms are based, creating new alleles in the process of crossover and mutation has no meaning in a system in which there is a fixed, discrete set of projects to be identified. Thus, a non-existent project ID evolved from the genetic algorithm may be replaced with an assigned Project ID. There are many different ways to ensure that, or at least raise the probability of, a project ID being generated through crossover or mutation will be a project ID in the set of project ID's. One way to is to provide a mapping function that maps an unassigned project ID to an assigned ID. Another way to achieve closure is to create a list of valid project ID's, and store in the plan the index of the project ID within the list rather than the project ID itself. If an index is created through crossover or mutation that is out of range (that is, greater than the number of projects in the system), a mapping function may map the out-of-range index into an in-range index.

Figure 5:
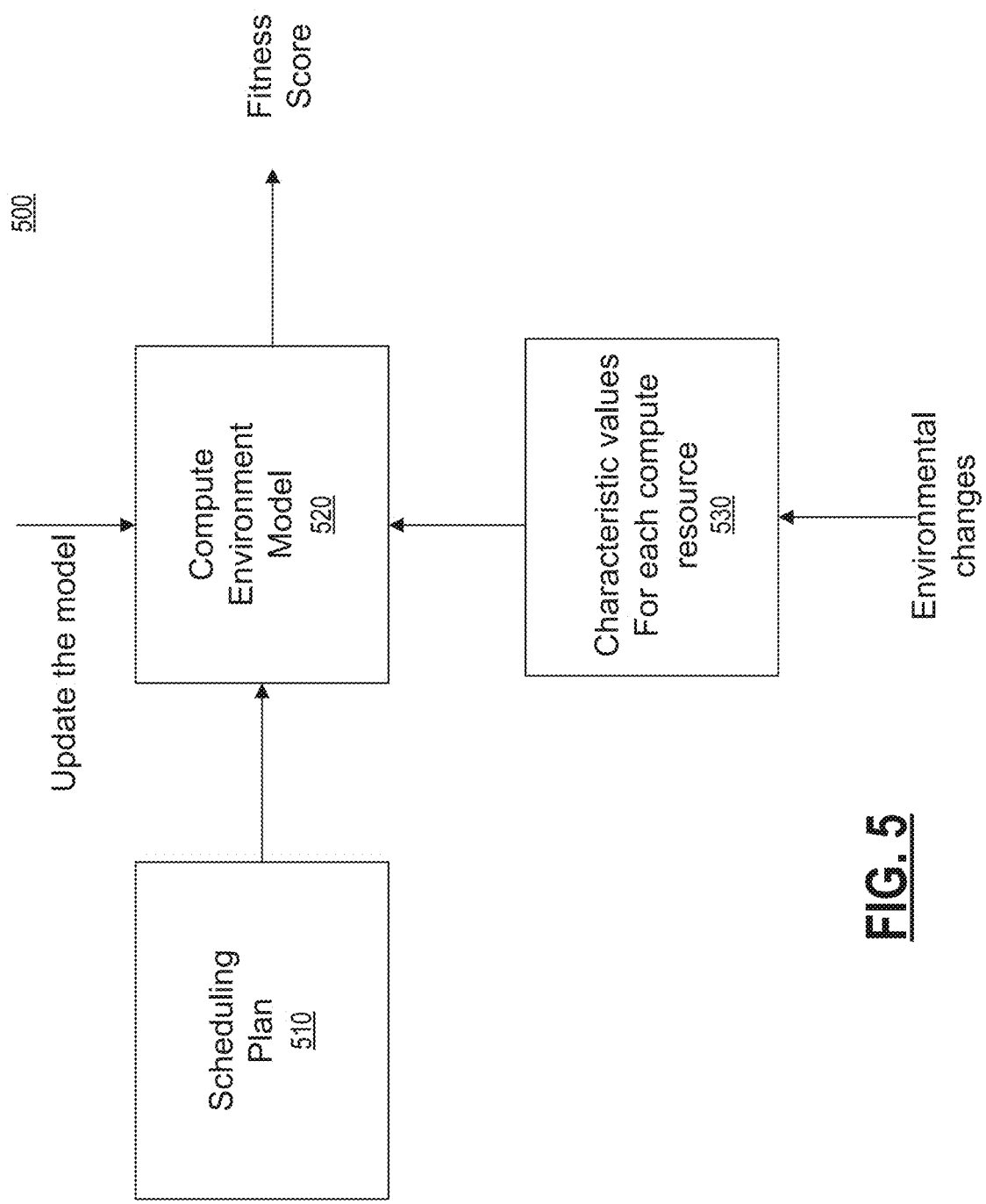
FIG. 5 is a block diagram that illustrates the interaction of components for determining a fitness value for a scheduling plan, according to an embodiment of the invention.

FIG. 5 is a block diagram that illustrates the interaction of components for evaluating the desirability of a scheduling plan, according to an embodiment of the invention. The Compute Environment Model 520 represents the fitness function that evaluates the fitness of each scheduling plan and assigns a fitness value. The scheduling plan (510) is one way of allocating a set of resources (fixed at the time of fitness evaluation) to a list of projects (fixed at the time of generating the scheduling plan). The scheduling plan having the best fitness value may be selected to direct the allocation of resources to projects. The Characteristic Values 530 includes characteristics of the compute resources in the compute environment including hardware and software description, cost to use, speed to transmit data to and from, and policy-based constraints such as availability of the resource or the legality of running an application that performs encryption.

The fitness function represented in the compute environment model 520 determines a fitness score and assigns a corresponding fitness value for each candidate schedule, and the fitness values are compared against one another. In an embodiment, the fitness value is a number between 0 and 1 with scores closest to 0 being the most desirable (fit) and scores closest to 1 being the least desirable (fit). For example, a generalized fitness function may be expressed as $$\left(\sum_{k=1}^{n} wk * Ck\right) \text{ for } 0 <= wk <= 1 \text{ and } \sum_{k=1}^{n} wk = 1$$

where each $C_k$ is a desirable characteristic of the plan and the corresponding $w_k$ is the weight assigned to that characteristic. For example, $C_1$ may represent maximizing profit for the service provider, $C_2$ may represent minimizing the price researchers pay to conduct experiments, and $C_3$ may represent minimizing elapsed or execution time for completing the computations. The fitness function may have additional characteristics that (1) are not easy to monetize, making it difficult to include in the determination of the value of a cost/price/time characteristic of a schedule, or (2) are characteristics that are important enough to be represented separately and directly controlled through the assignment of weights. An example of a characteristic that may be difficult to monetize is an indication of the extent to which the schedule respects the priority of projects waiting to be run. A schedule should be assessed as less desirable if it makes a high priority project wait while a lower priority project is run. An example of a characteristic that might be included in the fitness function for more direct control might be a measure of the extent to which environmental and safety considerations are respected. For example, a compute intensive application which uses all CPUs and GPUs in a PC can easily overheat a machine and cause a fire if not properly cooled. Internal temperature can be measured by the system and used as a characteristic in a function that tries to avoid assigning too much compute to a machine that is already too warm. The amount of weight associated with each characteristic in the fitness function may be selected to express the desired relative priority among the characteristics in the fitness function. As shown above, in an embodiment, each weight $w_k$ is a number between 0 and 1, and the sum of all the weights is 1. The value for each characteristic $C_k$ may also be a number between 0 and 1, with 0 being the most desirable value. The value of a characteristic to be minimized is directly proportional to its contribution to the fitness function. That is, smaller values for the characteristic are more desirable, and smaller values of the overall fitness function are more desirable. The values of characteristics to be maximized are inversely proportional to the overall fitness functions. Thus, the more desirable higher values of a maximizing characteristic are normalized before contributing to the fitness function. After mapping such a characteristic to a number between 0 and 1, the contribution to the fitness function may be determined by $(1-C_k)$. For example, it is desirable to maximize profit. Mapping a high profit value to a number between 0 and 1 would result in a number close to 1. Its contribution to the fitness function may be normalized by subtracting from 1 to get a number close to 0. U.S. Pat. No. 7,680,747 entitled CASH GENERATION FROM PORTFOLIO DISPOSITION USING MULTI OBJECTIVE GENETIC ALGORITHMS, issued Mar. 16, 2010, which describes the normalization and standardization of fitness function characteristics, is incorporated by reference herein for all purposes.

The value of each $C_k$ may be computed by another function based on lower-level characteristics or its value may be retrieved from a database. For example, the price researchers pay to conduct experiments according to a particular plan may be computed as a function of the cost per unit time to use the assigned compute resource, the amount of time to complete the experiment, and a configurable markup. An estimate of the time needed to run the experiment may be stored in and retrievable from a project (stored in project database 137), the cost per unit time may be stored in and retrievable from the compute resource (stored in characteristic values 530), and the configurable markup may be stored in a database or other source of configuration data.

In-between generating scheduling plans, values of the fitness characteristics in the model may change. New characteristics may be introduced and/or the weights associated with the attributes may be changed. Each new scheduling cycle may start with newly generated scheduling plans. A pure genetic algorithm would start with a randomly-generated plan without regard to known constraints. For example, a project may be randomly allocated a compute resource that does not provide sufficient memory or storage required by the project. Although this pure approach may be the best way to reach an optimal result, the compute time needed to reach that result may be too long. Another approach is to initialize a set of scheduling plans using the constraints known about each project. For example, if a project requires 2 compute resources, a plan can be initialized assigning the project to 2 processor cores within the same CPU, the CPU selected randomly among those having at least 2 processor cores available. By using a greedy algorithm for initially assigning projects to compute resources attempting to accommodate as many projects as possible, a generated solution is likely to be good, even if not optimal.

The first time a scheduling plan is generated, there are no existing projects executing in the environment, so all compute resources are available. Subsequently, as projects complete and new ones enter, creating new plans may be more efficient when the scheduler is aware of which resources are currently occupied and which ones that were previously occupied are now available. Each embodiment may include a decision regarding when to start creating a new plan and when to change the resource allocation based on the selected new plan. For example, a naive approach would be to wait until completion of all projects assigned to compute resources in the current plan, and to create a new plan for projects that have entered the system since the current plan was deployed. Creating a second plan having all resources available has the advantage that no projects need to be migrated from a previously allocated compute resource to another. However, the drawback of this naive approach is that the newly entered projects have to wait for the slowest project in the current plan to complete before getting assigned to compute resources.

In another embodiment, when a new project enters, the scheduler may try to schedule the new project onto an available compute resource according to the currently executing plan. That is, if there are unassigned resources when a new project enters the system, the new project may be accommodated without having to evolve a new plan.

In another embodiment, a group of newly entered projects may be inserted into a currently executing plan by evolving assignments for unused resources. For example, at the start of this "sub-scheduling" cycle, the set of unassigned compute resources may be determined by identifying resources not assigned in the currently executing plan, resources that were assigned to projects that have already completed, and any compute resources that were added to the system since the current plan was evolved. Then, a plan to assign the new group of projects to resource in this idle set of resources may be evolved and deployed without disturbing the projects already executing.

In another embodiment, an entirely new scheduling plan can be evolved independent of the currently executing plan. Even projects already executing may be assigned to a compute resource by the newly evolved plan, and the new plan may include migrating a project from one compute resource to another. When selecting the new plan, the fitness function may assign a cost to moving a project so that a plan involving project and/or data migration will be evaluated less favorably than one that doesn't.

Figure 6:
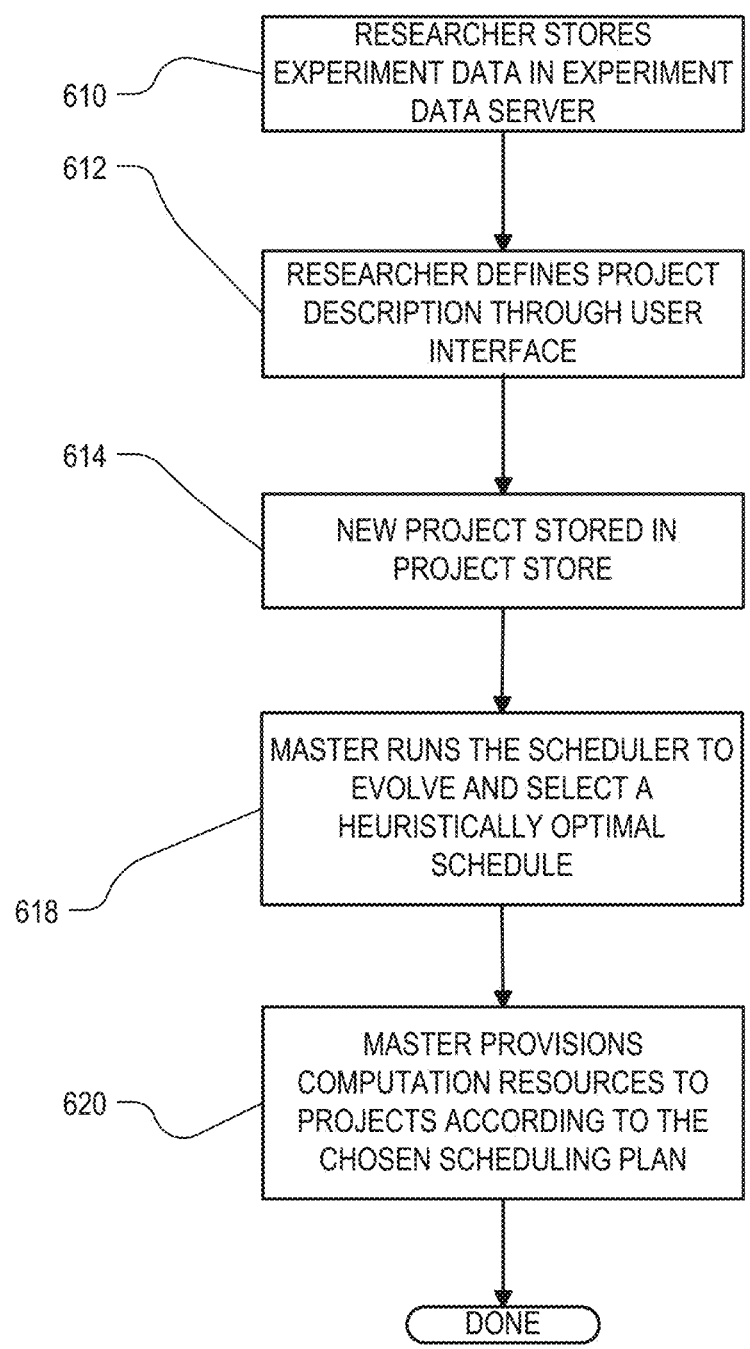
FIG. 6 is a flow diagram illustrating the high level steps for defining and running an experiment in the execution environment of FIG. 1, according to an embodiment of the invention.

When a newly evolved plan is selected for deployment, the Master 135 launches projects for execution according to the plan. FIG. 6 is a flow diagram illustrating the high level steps for defining and running an experiment in the execution environment of FIG. 1, according to an embodiment of the invention. In Step 610, a researcher in the researcher environment domain 110 uses researcher interface 113 to store experiment data used to perform the computation of the experiment. In Step 612, the researcher uses the user interface 115 to define a project having a project name and an application having at least one project container. Once defined, in Step 614, the project descriptions are stored in the project database 137 (which may be any kind of data store, repository, file system, etc). In Step 618, the master 135 runs scheduler 136 to perform the operations described in FIG. 3. The master receives from the scheduler a best scheduling plan which the master uses in Step 620 to direct the provisioning of resources to projects.

Figure 7:
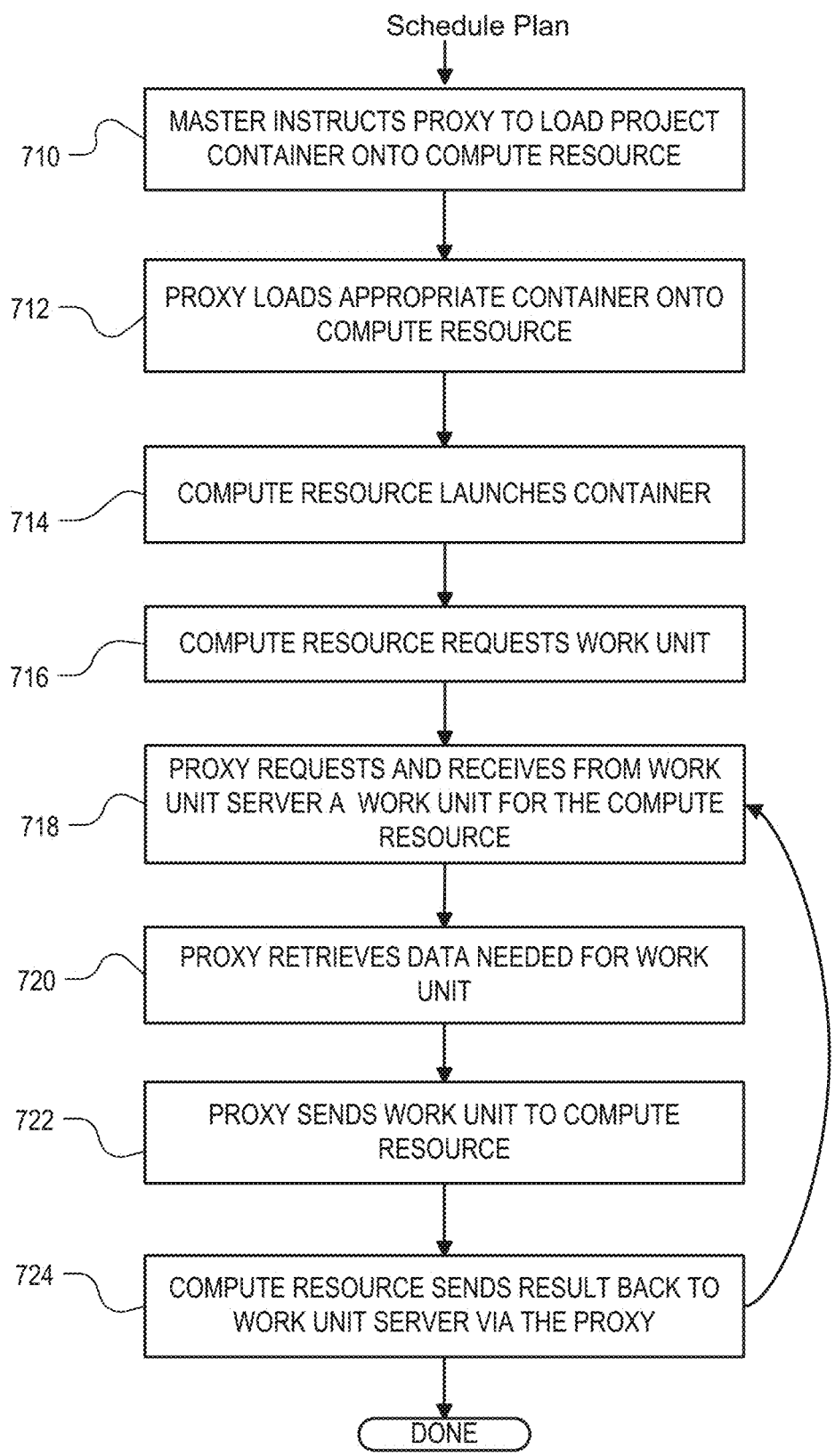
FIG. 7 is a flow diagram illustrating the steps to launch a work project in the execution environment of FIG. 1 according to a scheduling plan, according to an embodiment of the invention.
Figure 8:
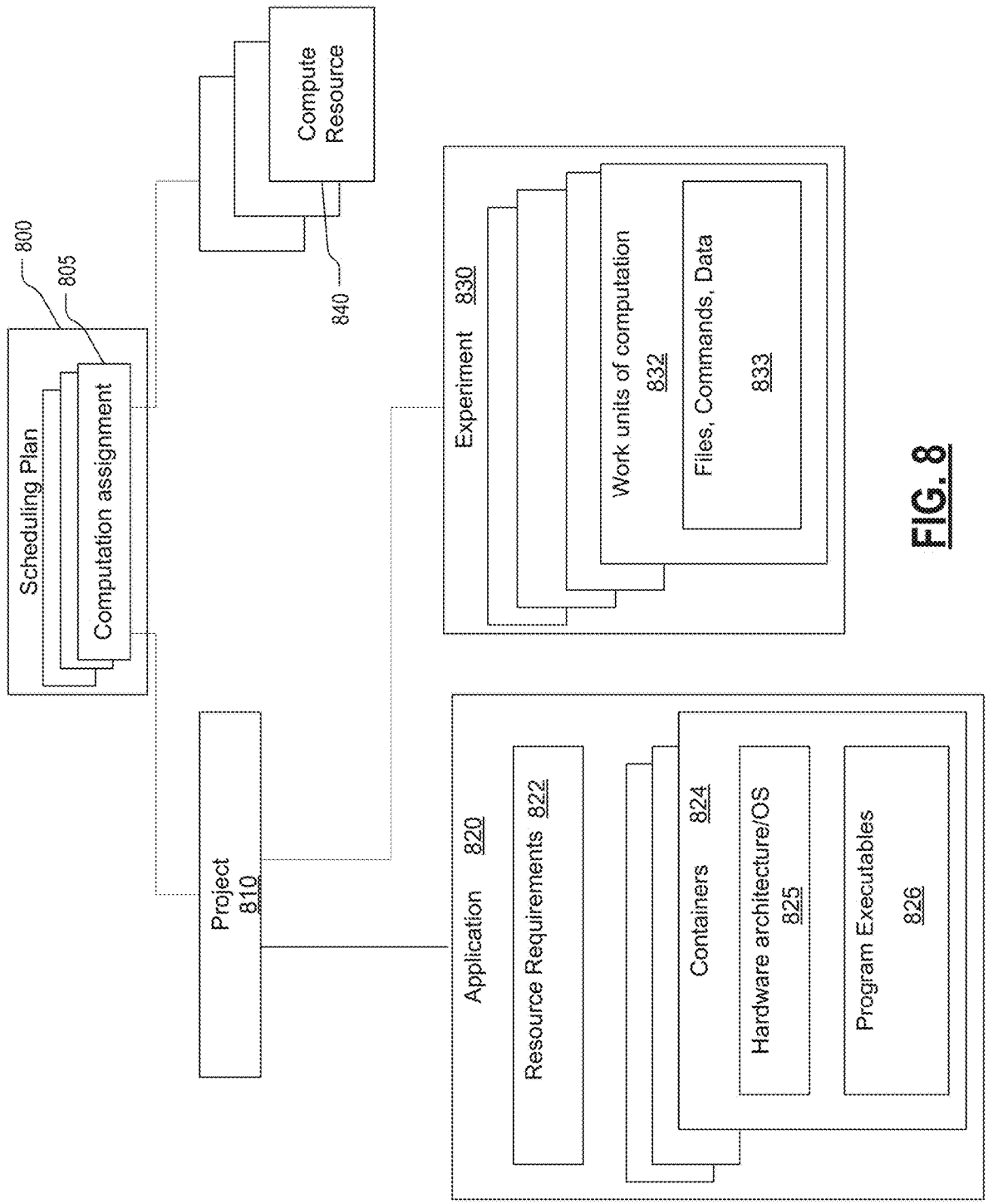
FIG. 8 is a block diagram illustrating the relationships among objects defined in the terminology section.

FIG. 7 is a flow diagram illustrating the steps to launch a work project in the execution environment of FIG. 1 according to a scheduling plan, according to an embodiment of the invention. In Step 710, Master 135 instructs a compute resource (or proxy thereof) to load the project container onto the compute resource. In this example embodiment, the master can connect to a proxy but not directly to a compute resource. However, if there is no intervening proxy, then the compute resource itself would perform the functions described for the proxy in this example. In Step 712, the proxy retrieves the appropriate container from the container store 127 and loads the project container onto the compute resource. Once the project container is stored on the compute resource, in Step 714 the compute resource launches the container which installs the project files and configures them to run on the compute resource.

In Step 716, the compute resource requests a work unit. In Step 718, the proxy relays to the work unit server 133 the request for a work unit and receives a work unit in response. In Step 720 the proxy retrieves the data needed for computation from the experiment data server 121 and stores the work unit to be loaded onto the assigned data server, which may also serve as the proxy.

The technology disclosed can be implemented in the context of any computer-implemented system including a database system. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Computer System

Figure 9:
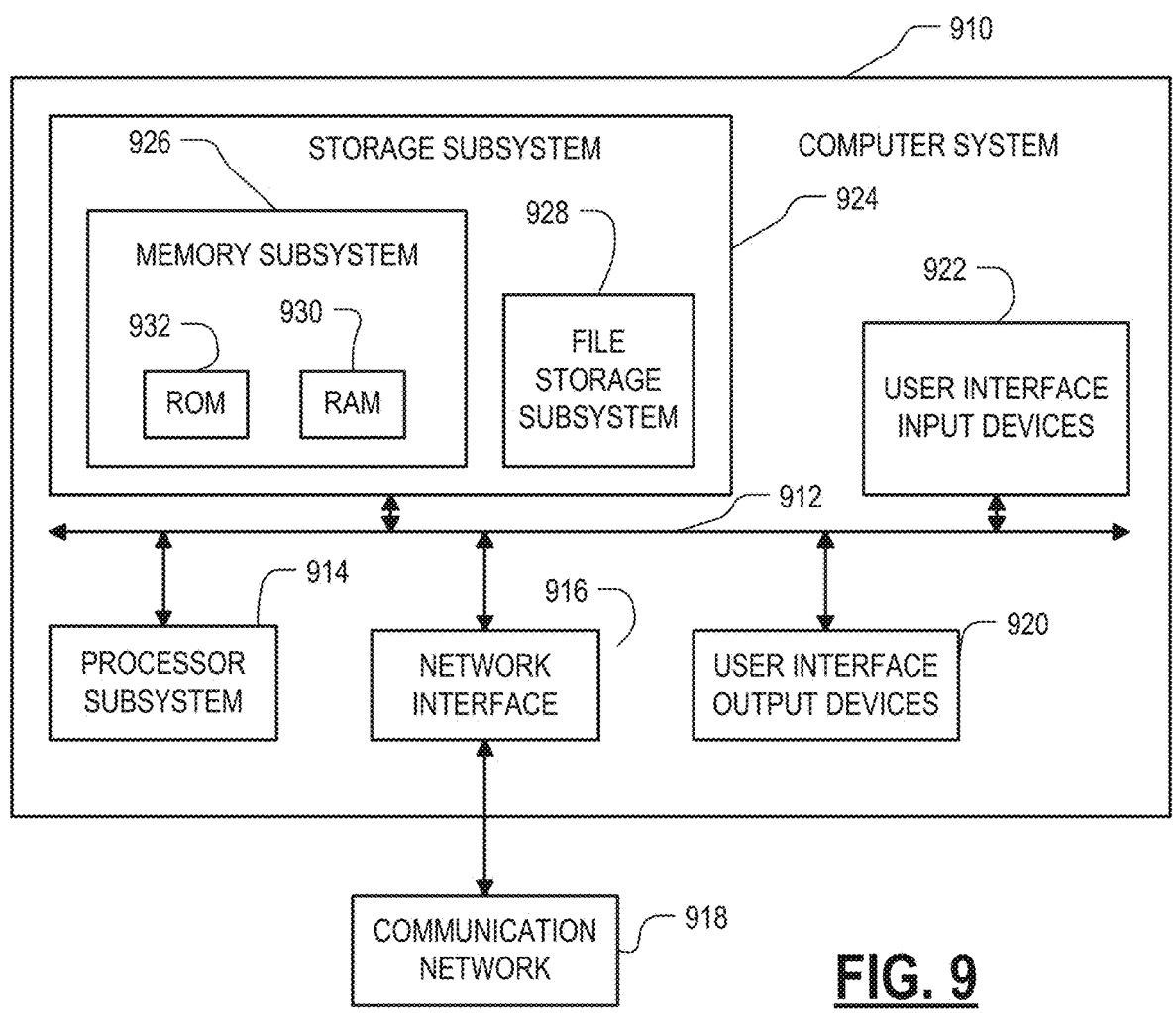
FIG. 9 is a block diagram of a computing environment, according to an embodiment of the invention.

FIG. 9 is a block diagram of an example computer system, according to one implementation. The processor can be an ASIC, CISC, or RISC processor. It can be an FPGA or other logic or gate array. It can include graphic processing unit (GPU) resources. Computer system 910 typically includes at least one processor subsystem 914 that communicates with a number of peripheral devices via bus subsystem 912. These peripheral devices can include a storage subsystem 924 including, for example, memory devices and a file storage subsystem 928, user interface input devices 922, user interface output devices 920, and a network interface subsystem 976. The input and output devices allow customer interaction with computer system 910. Network interface subsystem 916 provides an interface to outside networks, including an interface to corresponding interface devices in other computer systems.

User interface input devices 922 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 920 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative implementations of the bus subsystem can use multiple busses. Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

The examples described above should not be taken as limiting or preferred. These examples sufficiently illustrate the technology disclosed without being overly complicated, and are not intended to illustrate all embodiments of the technology disclosed. A person having ordinary skill in the art will appreciate that there are many potential applications for one or more implementations of this disclosure.

One of ordinary skill in the art can appreciate that a computer or other client device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

The technology disclosed can be implemented in the context of any computer-implemented system including a database system, a multi-tenant environment, or the like. Moreover, this technology can be implemented using two or more separate and distinct computer-implemented systems that cooperate and communicate with one another. The disclosed technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Also as used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

What we claim is:

1. A method for scheduling computation in an environment of heterogeneous computing resources, the method comprising:

storing in a memory a plurality of scheduling plans, each scheduling plan having an associated fitness value and a plurality of computation assignments, each computation assignment assigning a project of a plurality of projects to a compute resource of a plurality of compute resources on which to perform an experiment, each project describing an experiment having one or more work units of computation, and each compute resource of the plurality of compute resources having a plurality of characteristics affecting cost of executing an application associated with the project assigned to the compute resource;

choosing at least two scheduling plans from the plurality of stored scheduling plans;

creating a new scheduling plan and storing the new scheduling plan in the memory, wherein the new scheduling plan includes one or more computation assignments from each of the at least two chosen scheduling plans;

applying a fitness function to each scheduling plan of the plurality of scheduling plans to determine a fitness value, wherein the fitness value assigned to a scheduling plan is a function of cost and revenue associated with provisioning the compute resource to execute an application according to the computation assignments included in the scheduling plan, and further wherein the cost and revenue associated with provisioning the compute resource is determined from the plurality of characteristics having values $C_k$, each characteristic value being assigned a corresponding weight $W_k$, the fitness value being a number between 0 and 1 and the fitness function being expressed as follows $$\left(\sum_{k=1}^{n} w_k * C_k\right) \text{ for } 0 <= w_k <= 1 \text{ and } \sum_{k=1}^{n} w_k = 1;$$

storing the fitness value in association with the scheduling plan;
selecting a scheduling plan based on the associated fitness value, wherein fitness values approaching 0 are of higher fitness than fitness values approaching 1; and
provisioning the compute resources for executing the application corresponding to the experiment associated with each project according to the selected scheduling plan.

2. The method of claim 1, wherein a compute resource of the plurality of compute resources is one of a computation processor and a data storage system.

3. The method of claim 1, wherein each computation assignment of the plurality of computation assignments identifies a computation processor and a data storage system.

4. The method of claim 1, wherein the cost associated with provisioning the compute resource to execute an application is determined based at least on the cost of using the compute resource, time to complete computation, and cost to transfer data between the compute resource and a data repository storing the data used by the computation.

5. The method of claim 1, wherein the plurality of characteristics of a compute resource includes a plurality of:
cost of using a compute resource, or cost of accessing data; and
time to complete computation based on processor speed, or network bandwidth for transmitting data to and from a data repository storing the data used by the computation, or time to load data.

6. The method of claim 1, wherein the plurality of characteristics of a compute resource further includes information regarding the ability to meet the requirements of an application, including a plurality of:
hardware architecture, operating system, GPU, amount of disc space, or amount of memory; and
policy constraints including a time period when the resource is available for use or the legality of running an application that performs encryption.

7. The method of claim 6, further comprising discarding a scheduling plan that includes a computation assignment that assigns a project to a compute resource where the characteristics of the compute resource are not sufficient to execute the application corresponding to the project.

8. The method of claim 1, wherein the plurality of characteristics of a compute resource further includes presence, type and number of one or more members of the group consisting of GPUs, CPUs, FPGAs, APUs or DSPs.

9. The method of claim 1, wherein choosing the at least two scheduling plans from the plurality of stored scheduling plans is based on the relative fitness values among the plurality of stored scheduling plans.

10. The method of claim 1, further comprising:
while at least one application continues to execute on a compute resource assigned by the scheduling plan, receiving a new project;
creating a new compute assignment for the new project to run on one or more compute resources having available capacity according to the scheduling plan; and
adding the new compute assignment to the scheduling plan.

11. The method of claim 1, where the scheduling plan is a first scheduling plan and further comprising:
receiving a plurality of new projects;
while at least computation assignment assigned to a first compute resource by the first scheduling plan continues has not completed, creating a second scheduling plan for assigning the plurality of new projects on available compute resources.

12. The method of claim 11, wherein provisioning compute resources according to the second scheduling plan comprises migrating the at least one computation assignment from executing on the first compute resource to executing on a second compute resource.

13. A method for scheduling computation in an environment of heterogeneous computing resources, the method comprising:
storing in a memory a plurality of scheduling plans, each scheduling plan having an associated fitness value and a plurality of computation assignments, each computation assignment assigning a project of a plurality of projects to a compute resource of a plurality of compute resources on which to perform an experiment,
each project describing an experiment having one or more work units of computation,
and each compute resource of the plurality of compute resources having a plurality of characteristics affecting cost of executing an application associated with the project assigned to the compute resource;
choosing at least two scheduling plans from the plurality of stored scheduling plans;
creating a new scheduling plan and storing the new scheduling plan in the memory, wherein the new scheduling plan includes one or more computation assignments from each of the at least two chosen scheduling plans;
applying a fitness function to each scheduling plan of the plurality of scheduling plans to determine a fitness value, the fitness value being a number between 0 and 1 and the fitness function being expressed as follows $$\left(\sum_{k=1}^{n} w_k * C_k\right) \text{ for } 0 <= w_k <= 1 \text{ and } \sum_{k=1}^{n} w_k = 1,$$

wherein $C_k$, is characteristic value for each characteristic and $W_k$ is a weight assigned to each characteristic and n>2;
storing the fitness value in association with the scheduling plan;
selecting a scheduling plan based on the associated fitness value, wherein fitness values approaching 0 are of higher fitness than fitness values approaching 1; and
provisioning the compute resources for executing the application corresponding to the experiment associated with each project according to the selected scheduling plan.

14. The method of claim 13, wherein the cost associated with provisioning the compute resource to execute an application is determined based at least on the cost of using the compute resource, time to complete computation, and cost to transfer data between the compute resource and a data repository storing the data used by the computation.

15. The method of claim 13, wherein the plurality of characteristics of a compute resource includes a plurality of:
cost of using a compute resource, or cost of accessing data; and
time to complete computation based on processor speed, or network bandwidth for transmitting data to and from a data repository storing the data used by the computation, or time to load data.

16. The method of claim 13, wherein the plurality of characteristics of a compute resource further includes information regarding the ability to meet the requirements of an application, including a plurality of:
hardware architecture, operating system, GPU, amount of disc space, or amount of memory; and
policy constraints including a time period when the resource is available for use or the legality of running an application that performs encryption.

17. A method for scheduling computation in an environment of heterogeneous computing resources, the method comprising:
storing in a memory a plurality of scheduling plans, each scheduling plan having an associated fitness value and a plurality of computation assignments, each computation assignment assigning a project of a plurality of projects to a compute resource of a plurality of compute resources on which to perform an experiment,
each project describing an experiment having one or more work units of computation,
and each compute resource of the plurality of compute resources having a plurality of characteristics affecting cost of executing an application associated with the project assigned to the compute resource;
choosing at least two scheduling plans from the plurality of stored scheduling plans;
creating a new scheduling plan and storing the new scheduling plan in the memory, wherein the new scheduling plan includes one or more computation assignments from each of the at least two chosen scheduling plans;
applying a fitness function to each scheduling plan of the plurality of scheduling plans to determine a fitness value, wherein the fitness value assigned to a scheduling plan is a function of multiple different costs associated with provisioning the compute resource to execute an application according to the computation assignments included in the scheduling plan;
storing the fitness value in association with the scheduling plan;
selecting a scheduling plan based on the associated fitness value; and
provisioning the compute resources for executing the application corresponding to the experiment associated with each project according to the selected scheduling plan.

18. The method according to claim 17, wherein each of the multiple different costs associated with provisioning the compute resource is determined from a plurality of characteristics having values $C_k$, each characteristic value being assigned a corresponding weight $W_k$, the fitness value being a number between 0 and 1 and the fitness function being expressed as follows $$\left(\sum_{k=1}^{n} w_k * C_k\right) \text{ for } 0 <= w_k <= 1 \text{ and } \sum_{k=1}^{n} w_k = 1,$$

wherein fitness values approaching 0 are of higher fitness than fitness values approaching 1.

19. The method of claim 17, wherein the multiple individual costs associated with provisioning the compute resource to execute an application are selected from the group consisting of: the cost of using the compute resource, time to complete computation, and cost to transfer data between the compute resource and a data repository storing the data used by the computation.

* * * * *